United States Patent

Justice et al.

[11] 4,044,380
[45] Aug. 23, 1977

[54] ENCODER AND CONSTRUCTED ANSWER SYSTEM FOR TELEVISION

[75] Inventors: James W. H. Justice, Murrysville; Marcus H. Uhler, Pittsburgh, both of Pa.

[73] Assignee: Westinghouse Electric Corporation, Pittsburgh, Pa.

[21] Appl. No.: 591,212

[22] Filed: June 27, 1975

Related U.S. Application Data

[63] Continuation-in-part of Ser. No. 425,667, Dec. 17, 1973, abandoned.

[51] Int. Cl.² .............................................. H04N 7/08
[52] U.S. Cl. ................................... 358/142; 340/356; 358/147
[58] Field of Search ............. 178/5.8 R, 5.6, DIG. 23, 178/DIG. 35; 340/356; 179/15 BY; 358/142, 146, 147

[56] References Cited

U.S. PATENT DOCUMENTS

| | | | |
|---|---|---|---|
| 3,510,777 | 5/1970 | Gordon | 340/356 X |
| 3,529,081 | 9/1970 | Rider | 358/147 |
| 3,606,688 | 9/1971 | Zawels et al. | 178/5.8 R X |
| 3,932,698 | 1/1976 | Yanagimachi et al. | 178/DIG. 23 |
| 3,991,265 | 11/1976 | Fukuda et al. | 178/DIG. 23 |

OTHER PUBLICATIONS

Featherston and Luper, "Interactive Instructional System," *IBM Tech. Disclosure Bulletin*, vol. 14, No. 10, pp. 3125-3126, March 1972.

*Primary Examiner*—Robert L. Griffin
*Assistant Examiner*—Mitchell Saffian
*Attorney, Agent, or Firm*—M. P. Lynch

[57] ABSTRACT

In an educational television system, a constructed answer system is based on the use of code pulses that are repeated cyclically during their concealed transmission within a television video waveform. Indicia, e.g., letters of a word or formula, are preloaded into a store in the form of binary code as an output from a punched tape reader or an encoder for a keyboard. The encoder is reset following each transfer of encoded indicia to the store which is indexed by a shift register to render responsive successive columns of flip-flops in a matrixed arrangement. The store includes a column of AND gates to store a permanent "recycle code". The reading of the store is clocked by modified sync pulses applied by a shift register to a matrix arrangement of interconnected AND gates that are also connected to the output of the flip-flops. The readout of the store is repeated cyclically by a logic register that compares the number of encoded indicia in the store with the number of encoded indicia read from the store. Further circuitry, using AND gates, is responsive to a student keyboard to compare the student response with the decoded indicia signals to determine a correct response.

16 Claims, 9 Drawing Figures

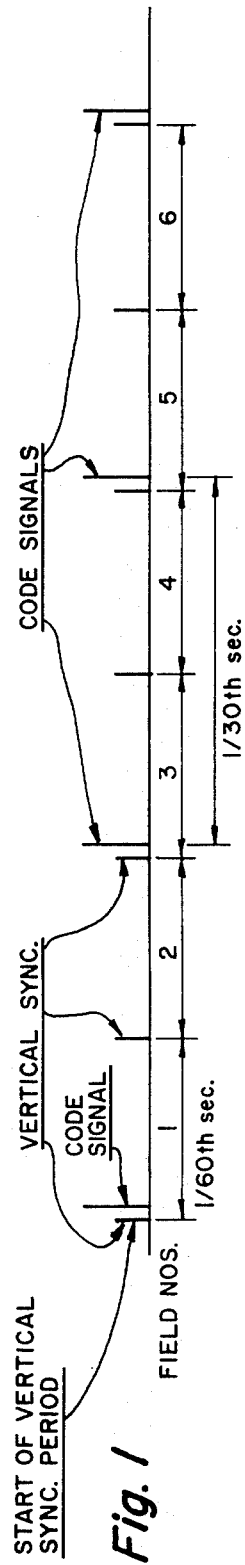
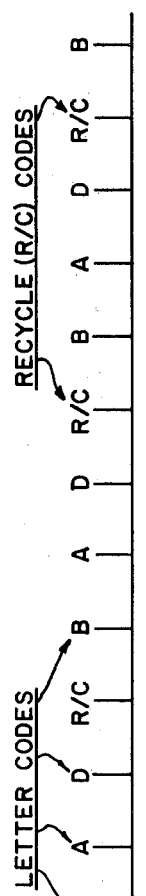
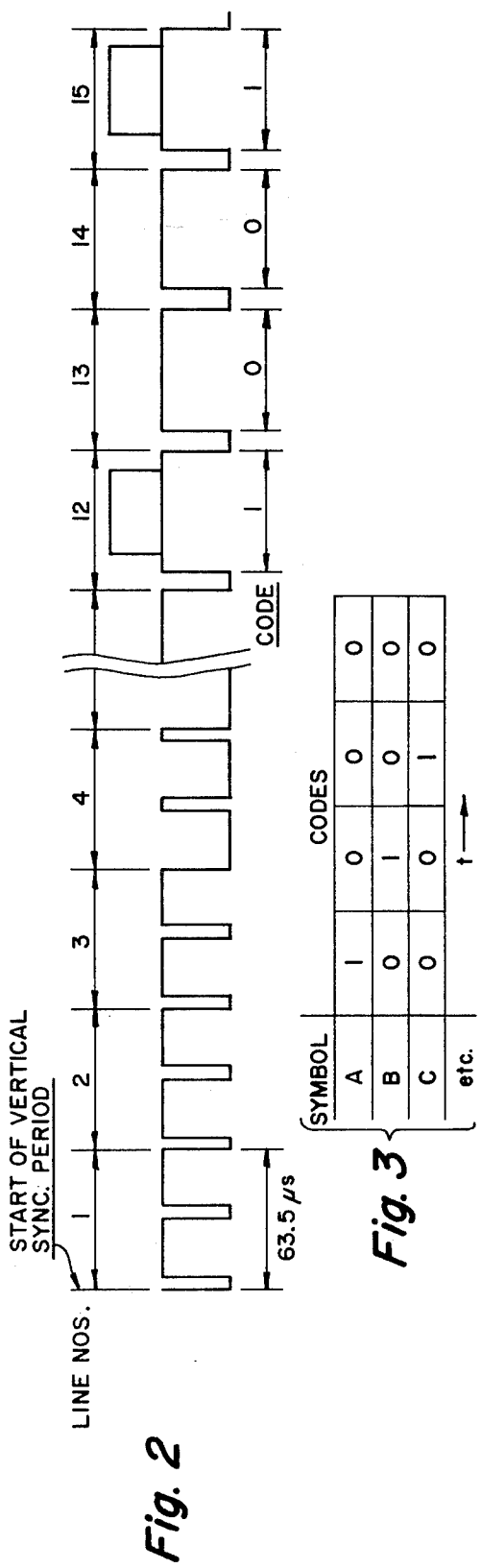
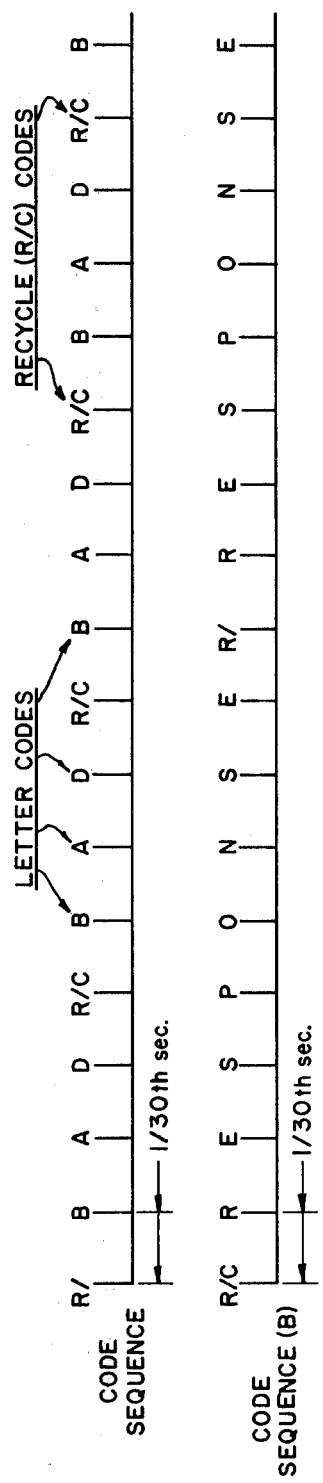
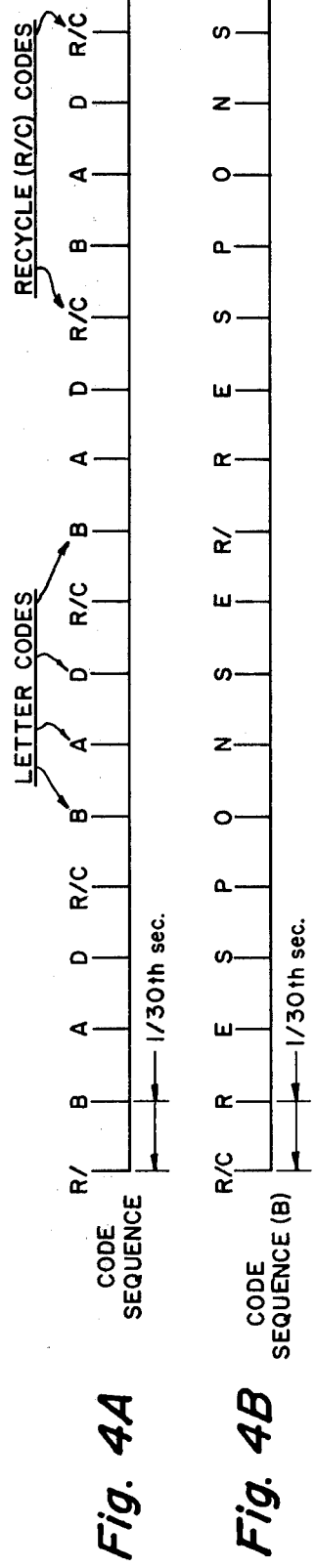

ENCODER AND CONSTRUCTED ANSWER SYSTEM FOR TELEVISION

CROSS REFERENCE TO RELATED APPLICATIONS

This application is a continuation-in-part of application Ser. No. 425,667, filed Dec. 17, 1973 now abandoned.

BACKGROUND OF THE INVENTION

This invention relates to a TV system wherein binary encoded signal pulses are repeated cyclically by a readout of a store for transmission in a concealed manner within the video waveform corresponding to an educational TV lecture. A student viewing the receiver may be asked to construct an answer such as to spell a word or describe a formula, by depressing appropriate response buttons of a keyboard. The student response is compared by the time decoding of the cyclically transmitted code to determine whether his response is correct.

Systems have been provided in the past to enhance the learning process through the use of television systems. A number of such systems have been proposed wherein a transmitter and receiver were equipped to make available to a student viewing the receiver, numerous pictures and at the same time optionally provide a plurality of audio signals. Recent developments in such television systems particularly adapted for the educational processes have been addressed to transmitting a plurality of separate and independent video pictures within a single television channel. One form of a TV system known in the art for transmitting separate and independent pictures on a single channel involves the branching technique which is disclosed in a prior U.S. Pat. No. 3,725,571, which issued Apr. 3, 1973 to the Assignee of the present application. This prior system provides a multiplex video transmission system for a plurality of n-separate pictures wherein every nth line of each of the pictures is selected for transmission beginning at a different line and wherein reception of the slected one of the pictures is accomplished by selecting from the plurality of lines transmitted every nth line commencing at the preselected line. The selected line is delayed by a medium having a bandwidth less than the bandwidth of the video pictures and recombined to follow the undelayed selected line so that the selected one of the pictures may be displayed with high quality resolution.

Irrespective of whether a particular educational TV system is developed to include branched TV pictures, great advantages to the learning process can be accomplished by providing a constructed answer system along with a single video picture transmitted on a given television channel. Such an answer system could be in many possible forms although typically involving the posing of a question via the audio and video signals which would call for a student response by way of his actuation of switches or keys in a keyboard. In this manner, for example, the student could be asked to recite a formula or spell a word which he would perform by depressing appropriate keys on a keyboard. The present invention provides a system to cyclically repeat the transmission of encoded signals to a receiver while concealed in the video waveform and further to provide a conditioned answer system at a reciver for a student's response. An important advantage of this system has reference to a memory store for encoded pulses which are read and tansmitted repeatedly during a given answer period whereby receiver circuitry for the code can be considerably reduced in size because the transmitted answer codes are repeated cyclically.

SUMMARY OF THE INVENTION

In accordance with the present invention, there is provided a code transmission system for repeating cyclically encoded signals read in a non-destructive manner from a memory store at a selected video scan rate for transmission within the video waveform.

The present invention further provides a receiver for detecting and gating from the video waveform the transmitted codes which are then decoded for comparison with student response signals at a command sequence.

More specifically there is provided according to the present invention an apparatus to repeat cyclically the transmission of code pulses corresponding to preselected encoded indicia, the code pulses being transmitted in succession within the waveform for video signals in a television system, the apparatus comprising store means for code pulses corresponding to encoded indicia; means for loading the store means with preselected encoded indicia; means for reading from the store means code pulses in succession correspondng to the preselected encoded indicia; means for controlling the means for reading to repeat cyclically the reading of code pulse by comparing the number of preselected encoded indicia loaded into the store means with the number of encoded indicia read from the store means; and control means for the means for reading to clock at a selected video transmission rate the readings of each successive code pulse of the encoded indicia loaded into the store means.

According to the present invention, there is further provided a receiver apparatus in an answer system employing code pulses corresponding to encoded indicia which are repeated cyclically in a serial manner during transmission within a waveform of a television video signal, the apparatus comprising means for deriving a television video signal including the code pulses transmitted therewith; means for separating the code pulses transmitted in a serial manner from the video signal; means for converting the code pulses from their occurring serial manner into time-collected groups of code pulses corresponding to encoded indicia; decoder means receiving each group of code pulses for producing signals repesenting recovered indicia; means for producing a plurality of signals corresponding to selected indicia; a plurality of AND gates separately receiving a signal repesenting the recovered indicia, these gates further separately receiving a signal corresponding to the selected indicia such that the signals to each AND gate represent corresponding ones of said selected and recovered indicia; means for delivering clocking pulses to the AND gates collectively; and a correct pulse shift register means responsive to a pulse from the AND gates for indexing the delivery of successive clocking pulses by the means for delivering clocking pulses.

These features and advantages of the present invention as well as others will be more fully understood when the following description is read in light of the accompanying drawings, in which:

FIG. 1 illustrates a waveform of a time sequence for transmitting code signals during the vertical sync period of a television video wavefom;

FIG. 2 is a waveform of a second manner in which code signals can be transmitted within a television video waveform;

Figure 5:
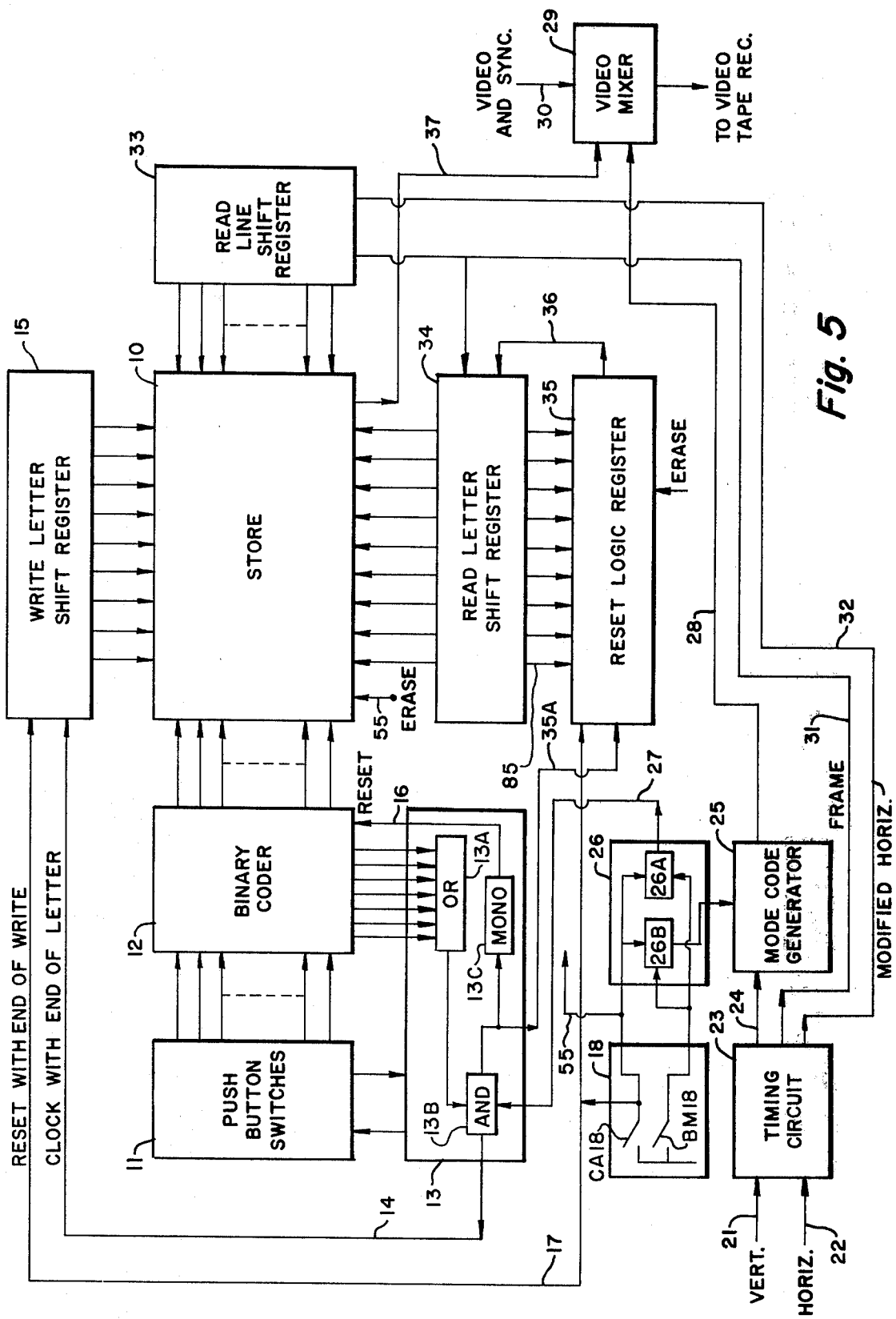
Figure 6:
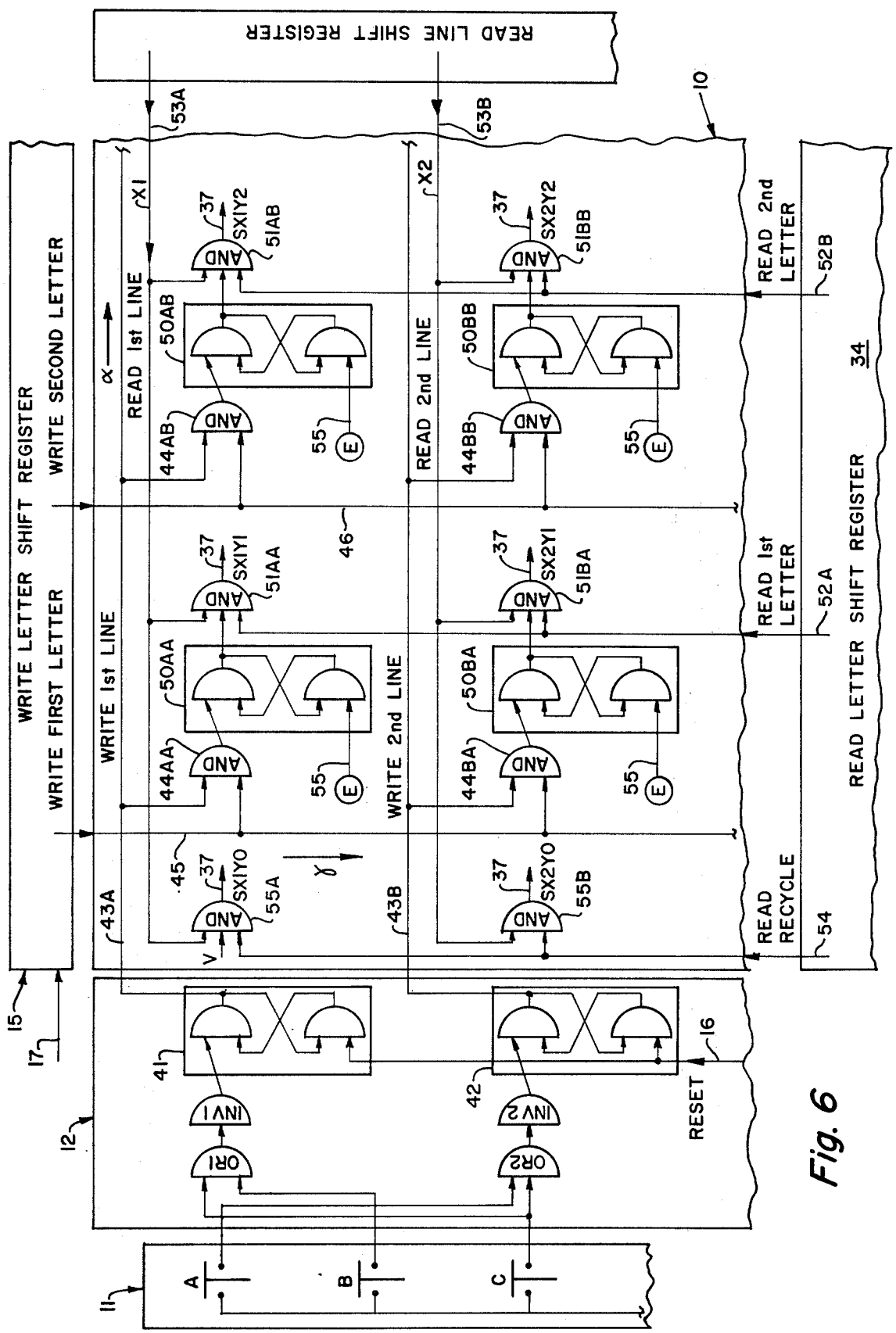
Figure 7:
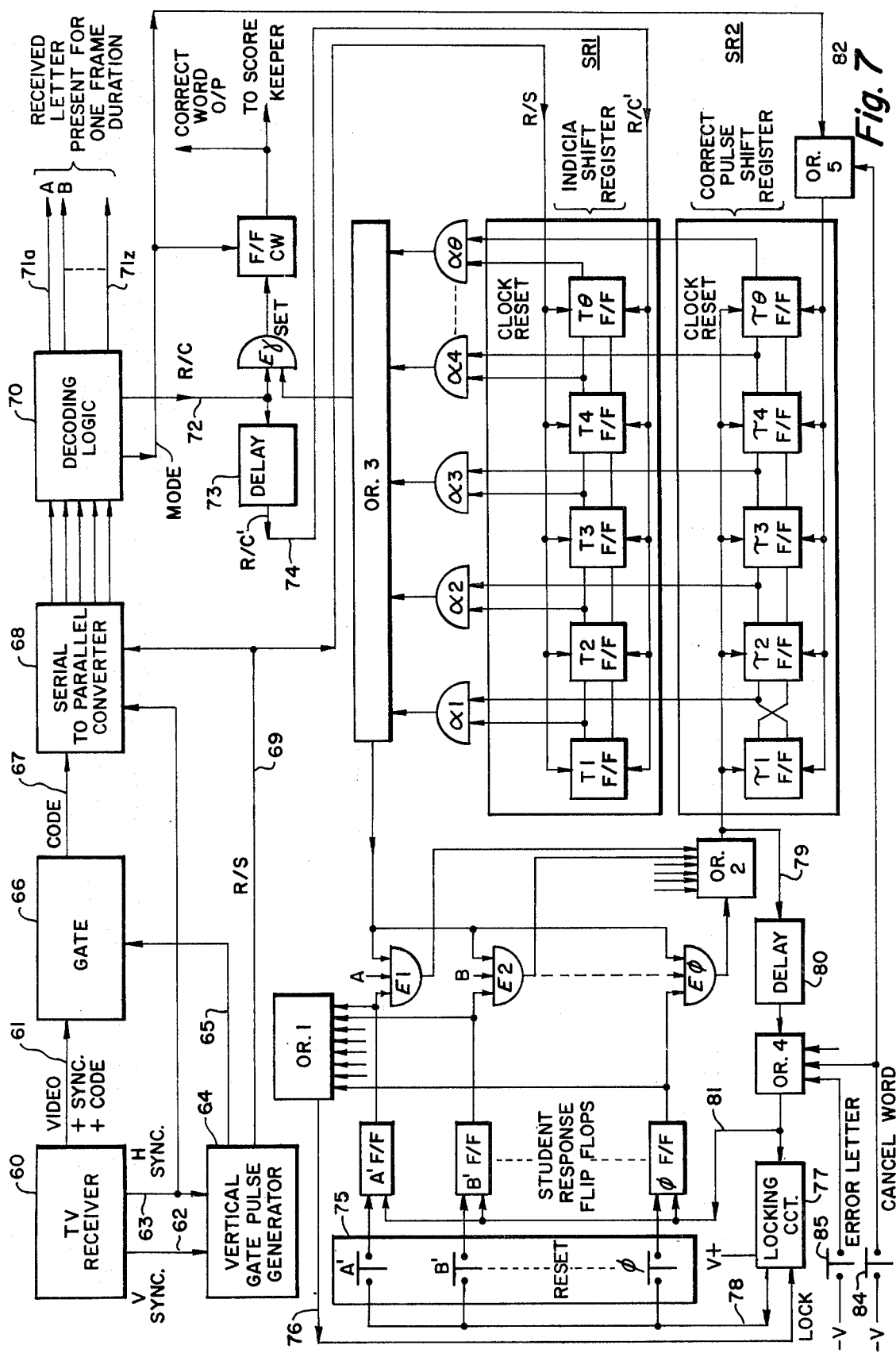
Figure 8:
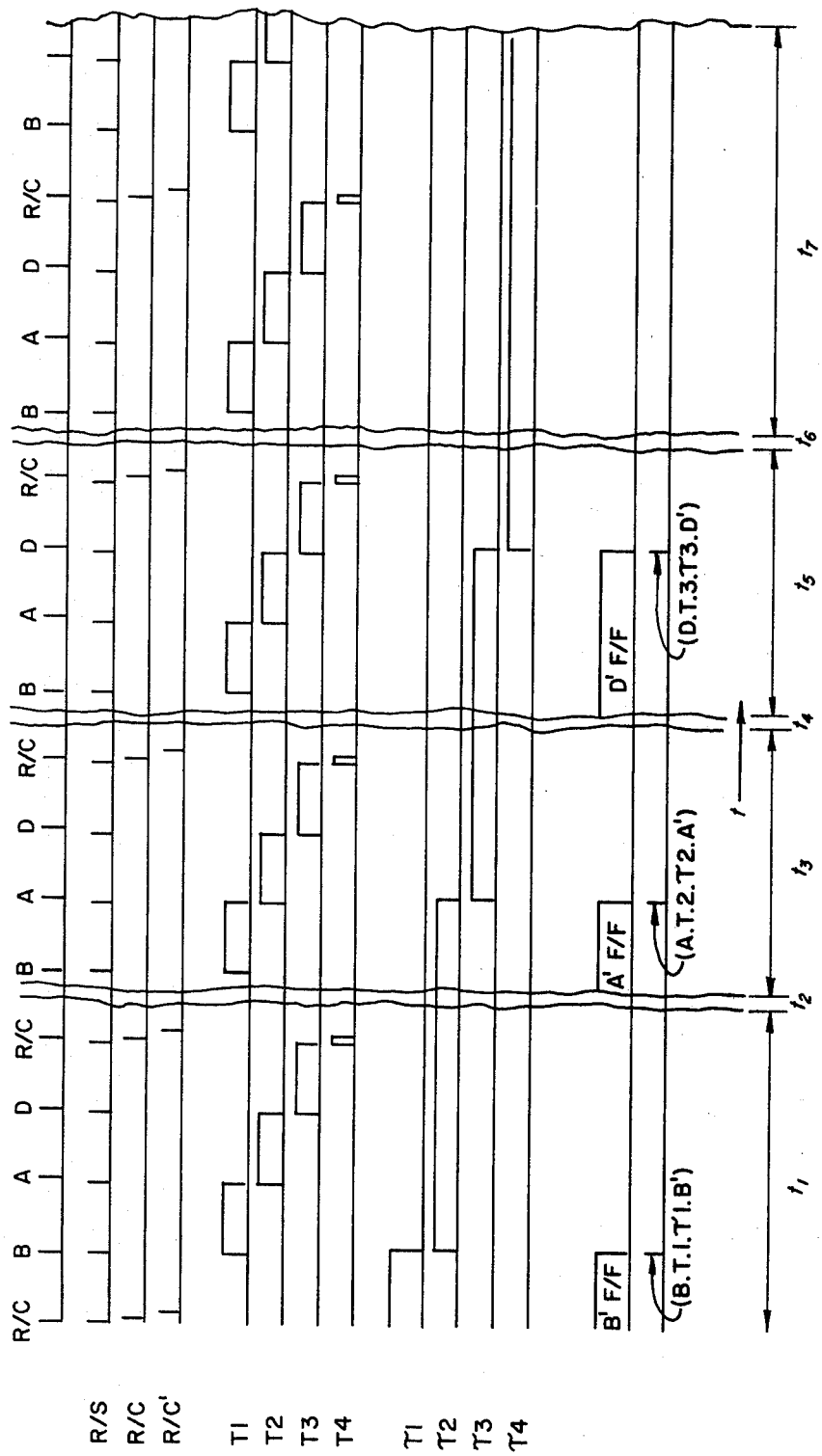

FIG. 3. is a typical truth table for the encoding and decoding of transmitted indicia;

FIG. 4A is a timing diagram for the transmission of the work "BAD" according to the present invention;

FIG. 4B is a timing diagram for the transmission of the work "RESPONSE" according to the present invention;

FIG. 5 is a block diagram of transmitter circuitry for the generation of cyclic encoded indicia at a transmitter;

FIG. 6 is a partial illustration of the Store circuitry shown in FIG. 5;

FIG. 7 is a block diagram of receiver circuitry forming a constructed answer system according to the present invention; and FIG. 8 is a series of waveforms illustrating the operation of the circuitry shown in FIG. 7.

DESCRIPTION OF THE PREFERRED EMMBODIMENT

In order to describe the principle and operation of the encoded and constructed answer system according to the present invention, let it be considered, for example, that an instructor desires to ask a student to spell a three letter word. This requires the transmission of the three letters or indicia, each in coded form to correspond to one of the letters. These codes are concealed in the video waveform during transmission and can be sent in many different ways, however, a suitable method would be to send the code during the vertical blanking interval. The codes could be sent once every field or once every video picture frame period made up of two fields. Since the features and advantages of the present invention are enhanced when applied to a branched TV system such as that disclosed in the aforesaid U.S. Pat. No. 3,725,571, it will be described in this context and the sending of a code will be described as taking place once every frame period.

FIG. 1 illustrates the position of the code pulses relative to the vertical sync periods of TV waveforms wherein it will be observed that the vertical sync period is followed by the transmission of a code signal and the 1/60th of a second later, one field time period, the next vertical sync period occurs which is, in turn, followed by a third vertical sync period immediately succeeded by the transmission of a code signal. Thus, the code signal are transmitted evey frame period of 1/30th of a second interval.

FIG. 2 illustrates a possible code arrangement wherein code pulses are transmitted at a particular time period during the verical sync interval. Thus, those skilled in the art in viewing FIG. 2 will observe that at the start of the vertical sync period, the first six horizontal pulses, commonly referred to as equalizing pulses, are transmitted during the first three scan lines each having a duration of 63.5 micorseconds. After the first three scan lines, the actual vertical sync pulses are transmitted during the scan lines 4–7. Following this, a next series of six equalizing pulses are transmitted, ending at scan line 11, for example. The scanning of the top of the picture conventionally does not take place until after scan line 15 and, therefore, during the scan lines 12–15, a period of time occurs during which code pulses can be transmitted.

As illustrated in FIG. 2, during scan line 12, a pulse occurs providing a code "1" while during the scan line 13, there is the absence of a pulse which provides "0" code. Likewise, during scan line 14, the absence of a pulse provides a "0" code and during scan line 15, the presence of a pulse provides a "1" code. During each of the scan lines 12–15, more than one code can be transmitted, thus providing greater capacity of the transmission of codes.

In FIG. 3 a code truth table is illustrated whereby the encoding of indicia is prescribed and similarly the decoding of the indicia. With the four-bit code shown, fifteen different arrangements can be obtained not including zero which would permit the transmission of a number N = 15 different indicia. If the number of pulses is increased to five, then N would be equal to thirty-one indicia, providing sufficient capacity to cover the alphabet plus some other symbols.

In FIG. 4A, there is illustrated the timing diagram for the transmission of the word "BAD" wherein it will be observed that the encoded letters are transmitted at 1/30th of a second interval. The code for "B" is sent during one frame period, the code for "A" is sent during the next and the code for "D" is sent during the following period. After the letter "D", recycle pulses or code R/C is transmitted. This mmanner of code transmission is continuously repeated for an allotted time period during which the student is expected to answer. The use of R/C pulses indicates the start and finish of the word or group of indicia.

In regard to FIG. 4B, the transmission of the word "RESPONSE", made up of eight letters, occurs by the code sequence shown wherein each of the letter is transmitted during one of the frame periods or 1/30th of a second duration. Since each of the frame periods has this time duration and the word "RESPONSE" is made up of eight letters, then the time necessary to transmit the word "RESPONSE" is given by the expression (N + 1)/30 seconds. Thus, a 14 letter word would be transmitted in 0.5 second and would be repeated every 0.5 second. If more than one code pulse was included during each scan line time period, more information could be transmitted in the given time or a larger number of indicia could be used. This would be obtained at the expense of reduced signal-to-noise of the code signals at the receiver and increased complexity of separation.

FIG. 5 illustrates one form of circuitry for the generation of cyclic code pulses at the transmitted which includes a Store 10 for binary encoded pulses. The Store is illustrated in greater detail in FIG. 6 and will be described hereinafter. This Store is preloaded with encoded indicia by an operator who by, for example, depressing pushbutton switches on a keyboard 11 selects appropriate letters or, more generally, indicia to be transmitted. For the purpose of disclosing the present invention, it will be discussed in terms of the transmission of a word made up of appropriate letters.

As the operator depresses each pushbutton switch on the keyboard 11, the letter thereby is transmitted by an electrical signal in lines connected to a Binary Encoder 12 wherein simultaneus or parallel code bits are formed and transferred to the Store. After each letter is written in the Store, an Instructor Logic circuit 13 generates a pulse in line 14 to index or clock a Write Letter Shift Register 15 to a next position for the transfer of the next encoded letter into the Store. At the same time, the Instructor Logic circuit 13 provides a signal in line 16 to reset the Binary Coder after encoding each letter.

More specifically, when a letter is inserted into the binary coder by actuating a pushbutton, the letter is coded into a digital form which appears as a voltage level change on at least one of the coder output lines. The output voltage levels from the coder are also applied to an OR gate 13A in the Instructor Logic 13. Each time a letter has been entered and encoded by the coder, an output signal is delivered by the OR gate 13A.

Different modes of operation are enabled through the use of Mode Switches 18 which include a switch CA18 for a constructed answer mode of operation according to the present invention and a switch BM18 for branching television signals according to the television branching system according to the aforesaid U.S. Pat. No. 3,725,571. When the mode switch CA18 is closed, an output signal is delivered by line 27 from the Mode and Control Logic 26 to an AND gate 13B in the Instructor Logic 13. When this AND gate also receives an output signal from OR gate 13A, a signal occurs on line 14 to clock the Write Letter Shift Register 15.

The output signal from the AND gate 13B also triggers a monostable multivibrator 13C to provide a delayed reset signal in line 16 to reset the binary coder as a preparation for entry of the next letter. Since an output signal from AND gate 13B occurs whenever a letter is coded and inserted into the Store 10, this output signal is delivered by line 35A to clock the Reset Logic Register 35. When switch CA18 is opened, as shown in FIG. 5, a signal is delivered by line 17 to reset both the Write Letter Shift Register 15 and the Reset Logic Register 35. This same signal in line 17 is delivered by line 55 to erase the Store 10.

The Mode and Control Logic 26 responds to the Mode Switches 18 which are set according to the desired operational mode of the system. This includes the constructed answer mode by employing switch CA18 or a picture branching mode by employing switch BM18 in a television system. When the constructed answer mode is selected by actuating switch CA18, the bistable 26A in the Mode and Control Logic 26 produces an enabling signal in line 27. At the same time, bistable 26B is reset and removes an enabling signal from the Mode Code Generator 25. When the branching mode is selected, bistable 26B is set and delivers an enabling signal to the Mode Code Generator. At the same time, bistable 26A is reset and removes the enabling signal from the AND gate 13B, thus disenabling the Instructor Logic 13. For added speed and convenience, a reader for punched tape could be used to preload the store with encoded indicia.

When the bits of code are read from the Store, it is necessary to synchronize this readout with the television waveforms. This is achieved by using suitably modified vertical and horizontal synchronizing waveforms to clock the readout procedure. A sync generator, not shown, delivers vertical sync pulses in line 21 and horizontal sync pulses in line 22 to a timing circuit 23. This timing circuit delivers a signal in line 24 to a mode code generator 25 which receives a signal from a mode and control logic circuit 26. Circuit 26 receives operator controlled input signals from switches 18. Circuit 26 also provides a mode and control signal in line 27 connected to the Instructor Logic 13. The output signal from the generator 25 is a control signal delivered by line 28 to a video mixer 29 forming part of the branched TV system according to the aforesaid U.S. Pat. No. 3,725,571. The video mixer 29 receives video and sync signals along line 30 and delivers an output signal to an RF modulator or, if desired, to a video tape recorder for transmission on a delayed basis.

The Timing Circuit 23 provides pulses in line 31 corresponding to each frame period and pulses in line 32 which are clocked to the horizontal scan rate for occurrence at times during lines 12-15 as indicated previously with respect to FIG. 2. The frame pulses and modified horizontal sync pulses in lines 31 and 32, respectively, are employed to clock a Read Line Shift Register 33 to read in a non-destructive manner the stored bits of code from the Store 10. Since the code bits are transmitted during successively occurring scan lines, it is necessary to read these code bits from the Store in serial form. Actual reading of the Store starts by reading the recycle code RC which is a permanently stored code. This is then followed by the reading of code bits for each letter indicia until finally the last letter is read out and when this occurs, a Read Letter Shift Register 34 is reset and restarts the readout of the Store. This process continues cyclically until the end of the read transmission period. Since the amount of information written into the store will differ from one mode to another or, more particularly from one desired answer to another, means are included to reset the Read Shift Register 34 after the last letter is read from the Store. This is achieved by a Reset Logic Shift Register 35. The Register 35 receives input pulses in lines 85 and from Instructor Logic 13 via line 35A as each letter is loaded into the Store so that the number of letters in the Store are represented in the Register 35. The Register 35 also receives the end of write pulse from line 17. The outputs from the elements of the Read Letter Shift Register 34 are compared with those from the elements in the Reset Logic Shift Register 35 and when coincidence occurs, which corresponds to the last letter read from the Store, a pulse is generated in line 36 which resets the Read Letter Shift Register 34. During the time when the encoded indicia is being read from the Store, the output consists of serially-arranged code bits transferred by line 37 to the video mixer 29 where they are combined with the video waveforms. At the end of the code transmission period, the Store and the Logic Register receive erase input signals as shown in FIG. 5.

In FIG. 6, there is illustrated a portion of the Store 10 which receives bits of encoded indicia from the Binary Coder 12 that is, in turn, connected to a series of pushbutton switches 11 of a keyboard. These pushbutton switches when selected to represent the alphabet, include switches A–Z of which switches A, B, and C are indicated. Upon actuation of the switch A, a signal is delivered to OR gate OR2. From switch B, a signal is applied to OR gate OR1 and from switch C, a signal is applied to OR gates OR1 and OR2. An output bit from OR1 passes through an inverter gate INV1 where it appears as a bit input to a flip-flop 41. An inverter INV2 receives a bit from OR2 and delivers a bit input to a flip-flop 42. These flip-flops receive a reset signal in line 16. Thus, when either the B or C button is pushed, a bit appears in line 43A at the output of flip-flop 41. In a similar manner, when either the A or C button is actuated, a bit appears in line 43B at the output of flip-flop 42. Upon the occurrence of a bit in line 43A, it is applied as an input pulse to AND gates 44AA, 44AB... 44A$\alpha$ that form an interconnected row of AND gates. In a similar manner, a bit in line 43B is applied as an input pulse to AND gates 44BA, 44BB... 44B$\alpha$ forming a second row of interconnected AND gates. While not shown, the store includes lines such as 43C, 43D. . . 43γ connected to rows of AND gates 44CA, 44CB. . . 44Cα, 44DA, 44DB . . . 44Dα, . . . 44γA, 44γB . . . 44γα, completing the matrix arrangement.

The Write Letter Shift Register 15 delivers pulses to lines 45, 46, etc. in a successively occurring manner which interconnect columns of AND gates in the store thus forming a α by γ matrix of interconnected AND gates. The successive occurrence of encoded indicia appearing as pulse bits in row lines 43A, 43B . . . 43α are stored as to each indicia by the successive pulses appearing successively in lines 45, 46, etc. thereby satisfying the AND condition of the AND gates which produces output pulses that actuate a respective one of flip-flops 50 in the matrix. In other words, the first of the encoded indicia is stored by the position of flip-flops 50AA, 50BA . . . 50γA. The second of the encoded indicia is stored by the position of flip-flops 50AB, 50BB . . . 50γB.

Readout of the encoded indicia from the store occurs by reading from successive columns the position of the flop-flops therein in a serial manner. This is accomplished by using timing pulses produced by the Read Letter Shift Register 34 and the Read Line Shift Register 33. Readout is accomplished by employing a α by γ matrix arrangement of three condition input gates 51. One of the condition input to the matrix arrangement of gates 51 is the output from the respective ones of the flip-flops 50. A second condition input is a pulse in lines 52A, 52B, etc. connected to the columns of AND gates 51. The pulses in lines 52A, 52B, etc, are delivered in succession to select the stored indicia from each column. A third condition input is a pulse in lines 53A, 53B . . . 53 α connected to respective rows of AND gates 51.

As indicated previously, the first signal read from the Store is the R/C signal, a permanent store, by the delivery of a signal from the Read Letter Shift Register 34 to a line 54 connected to a column arrangement of AND gates 55A, 55B . . . 55 γ. These gates are read out in serial form by successive pulses applied by lines 53A, 53B . . . 53 α. As coincidence successively occurs at the AND gates 55A, 55B . . . 55 γ, the output therefrom is in the form of serial pulses SX1YO, SX2YO, etc., which are delivered by branches of line 37 to the video mixer 29. Following the readout of the R/C code, a readout of the first column in the store produces successive pulses corrresponding to the first of the encoded indicia which appears as signals SX1Y1, SX2Y1, etc. delivered by branches of line 37 to the mixer 29. This is in turn followed by a readout of the second column in the store which produces serial pulses corresponding to the second selected encoded indicia and appears as serial code pulses SX1Y2, SX2Y2, etc. in branches of line 37 connected to the mixer 29. After a code transmission period has been completed, an erase signal is applied by branches of line 55 to each flip-flop 50 to reset these flip-flops to an original null position.

With reference now to FIGS. 7 and 8, there is illustrated a receiver for the cyclically repeating code signals transmitted as just described. As illustrated in FIG. 7, a conventional TV receiver 60 provides in line 61 a signal corresponding to the video waveform which includes sync pulses plus code bits transmitted, for example, during lines 12-15 following the vertical sync period. The receiver also provides in line 62, vertical sync pulses and in line 63, horizontal sync pulses. These sync pulses are connected to a vertical gate pulse generator 64. This generator produces a signal in line 65 to render a gate 66 conductive during the period of time when the horizontal scan lines 12-15 are delivered thereto by the line 61. In this manner, the gate 66 is used to extract from the video waveform only the code signals which are transferred by line 67 to a serial-to-parallel converter 68. This converter is controlled by a signal from the vertical gate pulse generator 64 in line 69 having the waveform R/S shown in FIG. 8 wherein pulses occur at 1/30th of a second intervals. The converter is also supplied with horizontal sync pulses in line 63 which in the American TV system occur at 63.5 microsecond intervals. Thus, the converter receives the necessary timed pulses in order that the sequentially received codes from horizontal scan lines can be converted into concurrent bits of code which are then transferred to a logic circuit 70 where decoding of the bits occur to produce electrical pulses in lines 71A–71α which correspond to, in line 71A the letter A, in line 71B, the letter B, etc. for the entire alphabet and other indicia. It is to be understood, however, that each of the signals in lines 71A–71 α are present in these lines for periods of one frame duration during each recycling of the word until the end of the television transmission sequence. The signals in lines 71A–71 α are connected to respective ones of a corresponding number of AND gates &1 . . . & α.

The logic 70 additionally provides an R/C train of pulses occurring according to the waveform illustrated in FIG. 8. These pulses are transferred by a line 72 to a delay 73 whereby modified pulses occur in line 74 having the waveform illustrated in FIG. 8 as R/C'. These R/C' pulses occur as illustrated after a slight time delay from the RC pulses preceding the first letter of each word transmitted.

A shift register SR1 is clocked by the pulses R/S and R/C'. This clocking occurs from T1-T2, T2-T3, etc. as shown by the waveforms in FIG. 8 once each frame by the R/S pulses from the receiver. The shift register is reset at the end of each word by the R/C' pulses such that each of the flip-flops T1-Tθ have their outputs in the zero position which outputs are connected respectively to AND gate α1, α2, α3 . . . αθ.

The student response is carried out by the actuation of switches A', B'. . . φ of a keyboard 75. The switch A' delivers a signal to an A' flip-flop having its output delivered to an AND gate &1 and also an OR1 circuit. In a corresponding manner, the switch B' delivers a signal to a B' flip-flop whose output is delivered to an AND gate &2 and also the OR1 circuit. Thus, for each switch in the keyboard 75, an associated flip-flop is triggered and a signal is applied to one of the AND gates and also the OR1 circuit. A signal from the OR1 circuit is transferred by the line 76 to a locking circuit 77 which produces a locking pulse in line 78 to render non-effective the keys in the keyboard 75 until the next R/C cycle. This prevents a student entry of more than one letter during an R/C cycle. The signal from the AND gates &1 . . . &φ are all connected to an OR2 circuit whose output is a pulse in line 79 which corresponds to the correct student's response to a letter as will be explained in greater detail hereinafter. This output signal in line 79 performs two functions. First, it resets the student response flip-flops by delivering a signal to a delay 80 connected to a gate OR4 that is, in turn, connected by a line 81 to each of the flip-flops A', B' . . . φ so that these flip-flops are now ready for the next student response. The second function of the signal in line 79 is to shift the output of flip-flops τ1 ... τθ in a shift register SR2. Thus, when the flip-flop shifts the register SR2 from τ1 to τ2, τ2 to τ3, etc., the correct student response has been attained. Shift register SR2 is reset by a mode control signal passing through a gate OR5 in line 82 from the logic 70. This mode control signal is received from the transmitter at the start of a student's response answer period. When the shift register SR2 is reset, the outputs from the α gates are such that flip-flop τ1 is in the "1" position and all other τ flip-flops are in the "0" position.

In order to more fully understand the operation of the circuitry shown in FIG. 7 along with the waveforms in FIG. 8, reference is now made to its operation in regard to the reception by the TV receiver of the word "BAD" transmitted in coded form. A correct student response occurs by actuation of the switch B' which sets the B' flip-flop in the "1" position, "1" is applied to gate &2. τ 1 flip-flop in the shift register SR2 is in the "1" position and when the T1 flip-flop in the shift register SR1 cycles to the "1" position, an output is obtained from the AND gate α 1 and also from an OR3 gate. The OR3 gate is connected to the output of each of the α1. . . αθ gates. The output from OR3 also appears at the input to &2. During the time the OR3 pulse is present, that is, from the T1 flip-flop, the B receiver input from the logic circuit 70, and the B' input to &2 are also present. Thus, all three of the required inputs to &2 are present simultaneously and a "1" output results which gives rise also to an output from OR2 indicating that the student has responded correctly to the first letter. The output from OR2 shifts the shift register SR2 to the next position and a "1" output is then present at the output of the τ2 flip-flop in shift register SR2. When the student responds by depressing the A' switch in the keyboard 75 and then finally the D' button, the OR2 output clocks the τ flip-flops in the shift register SR2 as previously described until finally the τ4 flip-flop is in the "1" position. When flip-flop T4 in the shift register SR1 and flip-flop τ4 in the shift register SR2 occur simultaneously there is a "1" output from the α4 gate causing an output from the OR3 which is applied to the & γ gate. Since the output to the & γ gate is present when the R/C cycle arrives at the gate in line 72, an output pulse sets the flip-flop CW to the "1" output condition and indicates that the student response to the word is correct. Additionally, if desired, the output from the flip-flop CW can also be applied to a scorekeeper since the answer by the student is complete at this point. The τ 4 flip-flop stays in the "1" position and an output is obtained from the OR3 whenever a "1" position occurs from the T4 flip-flop. The OR3 output coincides with the R/C signal and results in an output from the & γ gate. However, the flip-flop CW has already been set and the & γ gate has no effect. When the next mode signal occurs in line 82, a new answer is required, and the flip-flop CW and the shift registers SR1 and SR2 are all reset along with, at the same time, a resetting of the student response flip-flops A', B' ... φ.

Let us consider now the case where a student makes an error in his answer. When the student responds by depressing a switch on the keyboard, the OR1 circuit gives an output which is fed to a locking circuit. This removes the supply signal to the keyboard and prevents operation of the student response flip-flops until the locking circuit is reset by a signal from OR2, indicating a correct letter response, or a mode signal. Thus, if the student makes an error of which he is unaware, he will continue responding but his response will not be effective.

If the student makes an error within an answer period and the error is realized, he can correct the entire answer by depressing the cancel word switch 84. This applies a reset signal to the τ flip-flops via the OR5 circuit. Additionally, the OR4 circuit is triggered to unlock the locking circuit 77. The student can then start from the beginning of his answer. Another error correction arrangement is provided to enable the student to cancel his last selected switch on the keyboard 75. For this purpose, a switch 85 provides a cancel letter signal to the OR4 circuit thus producing a reset signal in line 81 to reset the student control flip-flops A', B' ... φ as well as unlocking the locking circuit.

Thus it can be seen that an important advantage of the receiver system described lies in the manner in which the code is received. Because the code for the indicia is repeated cyclically at the transmitter, it is not necessary to store all of these codes at the receiver. Such a store would require a large capacity and the codes would have to be written in and readout of the store on command. This would add considerably to the cost and complexity of the receiver.

Although the invention has been shown in connection with certain specific embodiments, it will be readily apparent to those skilled in the art that various changes in form and arrangement of parts may be made to suit requirements without departing from the spirit and scope of the invention.

What is claimed is:

1. In a transmitter, an apparatus to repeat cyclically the transmission of code pulses being transmitted in succession within the waveform for video signals in a television system, said apparatus comprising:
   means for storing code pulses corresponding to encoded indicia;
   means for loading said means for storing with preselected encoded indicia;
   shift register means for indexing said means for storing to receive successive encoded indicia;
   read shift register means for reading from said means for storing code pulses in succession corresponding to said preselected encoded indicia;
   means for controlling said means for reading to repeat cyclically the reading of code pulses by comparing the number of preselected encoded indicia loaded into said means for storing with the number of encoded indicia read from said means for storing; and
   control means coupled to said read shift register means for clocking at a selected video transmission rate the readings of each successive code pulse from said means for storing.

2. The apparatus according to claim 1 wherein said means for loading include a binary encoder for producing a plurality of code pulses for each encoded indicia and means for delivering a succession of signals corresponding to selected indicia to said binary encoder.

3. The apparatus according to claim 2 further comprising logic means for resetting said binary encoder following delivery of each encoded indicia to said means for storing.

4. The apparatus according to claim 1 wherein said control means is further defined to include a timing circuit receiving television video sync pulses for delivering clocking pulses to said means for reading.

5. The apparatus according to claim 4 further comprising a video mixer for combining into a television waveform for video signals the said code pulses read in succession from said means for storing by said means for reading.

6. The apparatus according to claim 1 wherein said means for storing is further defined to include:
- a plurality of AND gates, said AND gates being interconnected by first conducting lines to form a plurality of columns, said AND gates being further interconnected by second conducting lines to form a plurality of rows thereby defining a matrix of said AND gates;
- a flip-flop actuated by the output of each of said AND gates in said matrix;
- a read out AND gate receiving the output signal from said flip-flop thereby forming a matrix of readout gates;
- third conducting lines delivering an input signal to the readout gates in each of the columns forming said matrix; and
- fourth conducting lines delivering an input signal to the readout gates in each of the rows forming said matrix.

7. The apparatus according to claim 6 wherein said means for storing is further defined to include a plurality of R/C AND gates arranged in a column for producing recycle code pulses, one of said third lines delivering an input signal to said column of R/C AND gates, and said fourth conducting lines delivering an input signal to each of said R/C AND gates.

8. The apparatus according to claim 6 wherein said read shift register means include an indicia shift register for delivering clocked pulses to said third conducting lines, and a code shift register for delivering clocked pulses to said fourth conducting lines.

9. The apparatus according to claim 8 further comprising shift register means for delivering indexing pulses to said first conducting lines, said second conducting lines receiving pulses corresponding to encoded indicia from said means for loading.

10. A receiver apparatus in a constructed answer system employing code pulses corresponding to encoded indicia which are repeated cyclically in a serial manner during transmission within a waveform of a television video signal, said apparatus comprising:
- means for deriving a television video signal including said code pulses transmitted therewith in a cyclically repeating manner;
- means for separating said code pulses transmitted in said serial manner from said video signal;
- converter means receiving said code pulses in their occurring serial manner for conversion into time-collected groups of cyclically repeating code pulses corresponding to said encoded indicia;
- decoder means receiving each of said groups of cyclically repeating code pulses for producing cyclically repeating decoded signals representing recovered indicia;
- means for producing a plurality of signals corresponding to selected indicia to form a response answer input;
- a plurality of AND gates separately receiving a cyclically repeating signal representing said recovered indicia, said gates further separately receiving a signal corresponding to said selected indicia such that the signals to each AND gate represent corresponding ones of said selected and recovered indicia;
- means for delivering clocking pulses to said AND gates collectively; and
- a correct pulse shift register means responsive to a pulse from said AND gates for indexing the delivery of successive clocking pulses by said means for delivering.

11. The receiver apparatus according to claim 10 further comprising:
- pulse generator means receiving video sync pulses from said means for deriving to produce timing pulses; and
- said means for delivering includes an indicia shift register responsive to said timing pulses for indexing the delivery of said clocking pulses to said gate means.

12. The receiver apparatus according to claim 10 wherein said means for producing a plurality of signals corresponding to selected indicia include:
- a plurality of answer switches for selectively establishing signals to represent said selected indicia;
- a plurality of flip-flops each connected to a respective one of said answer switches for delivering selected indicia signals to said AND gates; and
- locking means actuated by each signal from said flip-flops for inhibiting actuation of said switches, said locking means being controlled by said control pulse shift register means.

13. The receiver apparatus according to claim 10 wherein said decoder means delivers a reset signal to said correct pulse shift register, said apparatus further comprising signal delay means receiving said reset signal for delivering a delayed reset signal to said indicia shift register.

14. The receiver apparatus according to claim 13 further comprising a correct answer AND gate receiving said reset signal and said clocking pulses for producing a correct indicia answer signal.

15. The receiver apparatus according to claim 13 wherein said indicia shift register is clocked by said timing pulses from said pulse generator means.

16. The receiver apparatus according to claim 15 wherein said correct pulse shift register means includes a plurality of flip-flops being reset by said reset signal and triggered by a pulse from said AND gates, and further wherein said indicia shift register further includes a plurality of flip-flops being reset by said delayed reset signal and triggered by said timing pulses from said pulse generator means, said apparatus further comprising a plurality of shift register AND gates each receiving a triggered pulse from a different one of said flip-flops included in said indicia shift register and said correct pulse shift register.

* * * * *